US012742958B2

(12) United States Patent
Luo et al.

(10) Patent No.: US 12,742,958 B2
(45) Date of Patent: Sep. 22, 2026

(54) DISPLAY MODULE AND IMAGING METHOD

(71) Applicant: HUAWEI TECHNOLOGIES CO., LTD., Shenzhen (CN)

(72) Inventors: Kun Luo, Shenzhen (CN); Pengfei Zhao, Shenzhen (CN); Congbiao Jiang, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 254 days.

(21) Appl. No.: 18/612,196

(22) Filed: Mar. 21, 2024

(65) Prior Publication Data

US 2024/0231074 A1 Jul. 11, 2024

Related U.S. Application Data

(63) Continuation of application No. PCT/CN2021/120137, filed on Sep. 24, 2021.

(51) Int. Cl.
*G02B 26/00* (2006.01)
*G09G 3/00* (2006.01)

(52) U.S. Cl.
CPC ........... *G02B 26/007* (2013.01); *G09G 3/005* (2013.01)

(58) Field of Classification Search
CPC .............. G02B 26/007; G02B 26/0875; G02B 27/0101; G02B 27/0172; G09G 3/005; G09G 3/001; G09G 3/003; G09G 3/007; G09G 3/2044; G09G 3/2055; G09F 9/33; G02F 1/29; H04N 9/3138; H04N 9/3188
USPC .......................................................... 359/290
See application file for complete search history.

(56) References Cited

U.S. PATENT DOCUMENTS 6,055,104 A * 4/2000 Cheng ...................... G02B 6/32 385/11
10,700,048 B2 6/2020 Zhang et al.
2005/0093796 A1* 5/2005 Fergason ............. H04N 9/3167 348/E5.145
2016/0282563 A1* 9/2016 Keyworth .......... G02B 6/29305
2018/0341223 A1* 11/2018 Shestak ................ G02B 6/0033
2019/0243134 A1* 8/2019 Perreault ................ G02B 26/08
(Continued)

FOREIGN PATENT DOCUMENTS

CN 109976079 A 7/2019
JP 2002287082 A * 10/2002

OTHER PUBLICATIONS

Extended European Search Report in European Appln. No. 21957841.6, mailed on Sep. 5, 2024, 8 pages.

*Primary Examiner* — Mohammed A Hasan
(74) *Attorney, Agent, or Firm* — Fish & Richardson P.C.

(57) ABSTRACT

The present disclosure relates to displays and imaging methods. One example display includes a self-luminous array, a pixel expansion apparatus, and a lens of an optical engine. The self-luminous array includes a plurality of self-luminous pixels that autonomously emit light. The pixel expansion apparatus includes a driver and a transparent flat plate. A light beam emitted by the self-luminous array is imaged on an imaging plane of the lens of the optical engine through the transparent flat plate. The transparent flat plate is driven by the driver. In some instances, for the display module, in a time dimension, a same unit imaging area can display different colors in a time-division manner, and in a space dimension, a shift of a light beam can be controlled.

20 Claims, 10 Drawing Sheets

(56) References Cited

U.S. PATENT DOCUMENTS

| | | | |
|---|---|---|---|
| 2019/0278102 | A1 | 9/2019 | Suter et al. |
| 2024/0015899 | A1* | 1/2024 | Kim ...................... H01L 25/167 |

* cited by examiner

Pixel unit

R R R R R
G G G G G
B B B B B
R R R R R
G G G G G
B B B B B
R R R R R
G G G G G
B B B B B

RGB arrangement

First state

| R | R | R | R | R |
|---|---|---|---|---|
| G | G | G | G | G |
| B | B | B | B | B |
| R | R | R | R | R |
| G | G | G | G | G |
| B | B | B | B | B |
| R | R | R | R | R |
| G | G | G | G | G |
| B | B | B | B | B |

Second state

| R | R | R | R | R |
|---|---|---|---|---|
| G | G | G | G | G |
| B | B | B | B | B |
| R | R | R | R | R |
| G | G | G | G | G |
| B | B | B | B | B |
| R | R | R | R | R |
| G | G | G | G | G |
| B | B | B | B | B |

DISPLAY MODULE AND IMAGING METHOD

CROSS-REFERENCE TO RELATED APPLICATION

This application is a continuation of International Application No. PCT/CN2021/120137, filed on Sep. 24, 2021, the disclosure of which is hereby incorporated by reference in its entirety.

TECHNICAL FIELD

This application relates to the field of optical technologies, and in particular, to a display module and an imaging method.

BACKGROUND

Augmented reality (AR) is a display technology that collects real-world information in real time and combines virtual information, images, and the like with the real world. Currently, AR devices have increasingly high requirements on a small volume, a light weight, high efficiency, a large field of view (field of view, FOV), a large eyebox (eyebox) range, and the like.

To reduce a volume of an AR device, a display panel in the AR device may be made of a self-luminous pixel array such as a micro organic light-emitting semiconductor (micro organic light-emitting diode, micro OLED) and a micro light-emitting diode (micro light-emitting diode, micro LED). Each pixel in the micro OLED or micro LED includes spatially-separated RGB subpixels. Because resolution of human eyes is limited, when sizes of the subpixels are extremely small, the human eyes cannot distinguish spatial separation of the RGB subpixels, and consider the RGB subpixels as one full-color pixel, to implement full-color display.

Due to a spatially-separated color pixel structure, actual display resolution of the micro OLED or micro LED is ⅓ of subpixel resolution. Consequently, a resolution loss is caused. For example, the self-luminous pixel array includes 1920*1080 subpixels, and resolution of an actually displayed image is equivalent to resolution of displaying 1920*1080/3. If the resolution needs to be improved, only a quantity of subpixels can be increased. However, when the sizes of the subpixels cannot be reduced, a size of the display panel is increased, and a volume of an optical engine is further increased.

SUMMARY

This application provides a display module and an imaging method, to increase image display resolution without increasing a volume of an optical engine.

According to a first aspect, an embodiment of this application provides a display module, including a self-luminous array, a pixel expansion apparatus, and a lens of an optical engine. The self-luminous array includes a plurality of self-luminous pixels. A color of a light beam emitted by a first self-luminous pixel in the plurality of self-luminous pixels is different from a color of a light beam emitted by a second self-luminous pixel. The first self-luminous pixel is adjacent to the second self-luminous pixel. The pixel expansion apparatus includes a driver and a transparent flat plate. The driver is configured to drive rotation of the transparent flat plate. A light beam emitted by the self-luminous array is imaged on an imaging plane of the lens of the optical engine through the transparent flat plate. The transparent flat plate is configured to be driven by the driver to perform a rotation operation, so that a first area on the imaging plane displays different colors in a time-division manner, and the first area is any unit imaging area in an imaging area of the imaging plane.

In a solution provided in an embodiment of this application, the driver drives, in a time-division manner, the transparent flat plate to rotate, to translate the light beam in a time-division manner, so that one unit imaging area may display different colors in a time-division manner. With persistence of vision function and a visual synthesis function of human eyes, the human eyes cannot recognize translation or a change of a pixel light beam, and the human eyes see color pixels at this pixel location, so that the human eyes see a high-resolution image. Based on this, in a time dimension, a same unit imaging area displays different colors in a time-division manner, and in a space dimension, a shift of the light beam is controlled, so that a high-resolution full-color image is implemented without increasing a volume of the optical engine.

In a possible implementation, N self-luminous pixels in the self-luminous array form one pixel unit. The N self-luminous pixels include at least two self-luminous pixels that emit light beams of different colors. N is a positive integer greater than 2. The driver is specifically configured to control, in a time-division manner, rotation of the transparent flat plate in a rotation periodicity of the transparent flat plate, so that the transparent flat plate switches between N1 states, and the first area on the imaging plane displays colors of N self-luminous pixels of a first pixel unit in a time-division manner. N1 is a positive integer less than or equal to N. The first pixel unit is one pixel unit included in the self-luminous array. According to the foregoing solution, the N self-luminous pixels in one pixel unit are displayed in a same area in a time-division manner, so that the human eyes see the colors of the N self-luminous pixels in a time-division manner. When a time-division display speed is high, the human eyes cannot recognize a translation change of a pixel, and in terms of visual effect, resolution of a displayed image may be improved without increasing the volume of the optical engine.

In a possible implementation, the rotation periodicity includes a first time unit and a second time unit. In the first time unit, when the transparent flat plate is driven by the driver to rotate to be in a first state, the transparent flat plate outputs a first light beam. In the second time unit, when the transparent flat plate is driven by the driver to rotate to be in a second state, the transparent flat plate outputs a second light beam. The first state and the second state are two states in N states. The first time unit is adjacent to the second time unit. A spacing between the first light beam and the second light beam is a first spacing. The first spacing is related to sizes of the N self-luminous pixels included in the first pixel unit. In the foregoing, a rotation status of the transparent flat plate is controlled, to control a shift spacing between light beams of two adjacent time units, so that an imaging area displays different colors in a time-division manner. In this way, the high-resolution full-color image is implemented without increasing the volume of the optical engine.

In a possible implementation, a value of N1 is related to the sizes of the N self-luminous pixels included in the first pixel unit.

In a possible implementation, the sizes of the N self-luminous pixels included in the first pixel unit are the same. N1 is equal to N.

It is assumed that the self-luminous array has X*Y spatially-separated self-luminous pixels. If there is no pixel expansion apparatus, only X*Y/N full-color pixels can be actually displayed. In an embodiment of this application, due to existence of the pixel expansion apparatus and through a design, a frame rate is increased, so that display effect of X*Y full-color pixels may be displayed. In addition, because the pixel expansion apparatus is of a thin flat plate structure, and does not clearly occupy a volume, a small volume of the optical engine may be ensured. In this way, a small-volume high-resolution display module is implemented.

In a possible implementation, the sizes of the N self-luminous pixels included in the first pixel unit are the same. A spacing between any two adjacent self-luminous pixels in the N self-luminous pixels is a second spacing.

The first spacing is the same as the second spacing.

In a possible implementation, the first pixel unit includes the first self-luminous pixel and the second self-luminous pixel, and further includes a third self-luminous pixel. A size of the second self-luminous pixel is twice a total size of the first self-luminous pixel and the third self-luminous pixel. N is 3, and N1 is 2.

In a possible implementation, a spacing between a total area occupied by the first self-luminous pixel and the third self-luminous pixel and an area occupied by the second self-luminous pixel is a third spacing.

The first spacing is the same as the third spacing.

It is assumed that the self-luminous array has X*Y*3 spatially-separated self-luminous pixels. If there is no pixel expansion apparatus, only X*Y full-color pixels can be actually displayed. According to the foregoing solution, due to existence of the pixel expansion apparatus and through the design, the frame rate is increased, so that display effect of X*Y*2 full-color pixels may be displayed. In addition, because the pixel expansion apparatus is of the thin flat plate structure, and does not clearly occupy the volume, the small volume of the optical engine may be ensured. In this way, the small-volume high-resolution display module is implemented.

In a possible implementation, the first pixel unit includes the first self-luminous pixel and the second self-luminous pixel, and the first self-luminous pixel and the second self-luminous pixel are sequentially set in a specified direction.

A shift direction of the second light beam relative to the first light beam is the specified direction.

In a possible implementation, a rotation angle of the transparent flat plate in the second state relative to the transparent flat plate in the first state is a specified angle. The specified angle and the first spacing meet the following condition:

$$\Delta y = d \sin\theta\left(1 - \sqrt{\frac{1-\sin^2\theta}{n^2-\sin^2\theta}}\right),$$

where $\Delta y$ represents the first spacing, $\theta$ represents the specified angle, d represents a thickness of the transparent flat plate, and n represents a refractive index of the transparent flat plate.

According to a second aspect, an embodiment of this application provides another display module, including a self-luminous array, a pixel expansion apparatus, and a lens of an optical engine. The self-luminous array includes a plurality of pixel units. The pixel units include N self-luminous pixels. Colors of light beams emitted by at least two of the N self-luminous pixels are different.

The pixel expansion apparatus includes a driver and a transparent flat plate. The driver is configured to drive, in a time-division manner, the transparent flat plate to rotate, so that the transparent flat plate switches between N1 states. N1 is a positive integer less than or equal to N.

The transparent flat plate is configured to receive a light beam emitted by the self-luminous array, and image the received light beam on an imaging plane of the lens of the optical engine.

In a possible implementation, the transparent flat plate is driven by the driver to perform a rotation operation, so that a first area on the imaging plane displays different colors in a time-division manner, and the first area is any unit imaging area in an imaging area of the imaging plane.

In a possible implementation, N self-luminous pixels in the self-luminous array form one pixel unit. The N self-luminous pixels include at least two self-luminous pixels that emit light beams of different colors. N is a positive integer greater than 2. The driver is specifically configured to control, in a time-division manner, rotation of the transparent flat plate in a rotation periodicity of the transparent flat plate, so that the transparent flat plate switches between the N1 states, and the first area on the imaging plane displays colors of N self-luminous pixels of a first pixel unit in a time-division manner. N1 is a positive integer less than or equal to N. The first pixel unit is one pixel unit included in the self-luminous array.

In a possible implementation, the rotation periodicity includes a first time unit and a second time unit. In the first time unit, when the transparent flat plate is driven by the driver to rotate to be in a first state, the transparent flat plate outputs a first light beam. In the second time unit, when the transparent flat plate is driven by the driver to rotate to be in a second state, the transparent flat plate outputs a second light beam. The first state and the second state are two states in N states. The first time unit is adjacent to the second time unit. A spacing between the first light beam and the second light beam is a first spacing. The first spacing is related to sizes of the N self-luminous pixels included in the first pixel unit. In the foregoing, a rotation status of the transparent flat plate is controlled, to control a shift spacing between light beams of two adjacent time units, so that an imaging area displays different colors in a time-division manner. In this way, a high-resolution full-color image is implemented without increasing the volume of the optical engine.

In a possible implementation, a value of N1 is related to the sizes of the N self-luminous pixels included in the first pixel unit.

In a possible implementation, the sizes of the N self-luminous pixels included in the first pixel unit are the same. N1 is equal to N.

It is assumed that the self-luminous array has X*Y spatially-separated self-luminous pixels. If there is no pixel expansion apparatus, only X*Y/N full-color pixels can be actually displayed. In an embodiment of this application, due to existence of the pixel expansion apparatus and through a design, a frame rate is increased, so that display effect of X*Y full-color pixels may be displayed. In addition, because the pixel expansion apparatus is of a thin flat plate structure, and does not clearly occupy a volume, a small volume of the optical engine may be ensured. In this way, a small-volume high-resolution display module is implemented.

In a possible implementation, the sizes of the N self-luminous pixels included in the first pixel unit are the same. A spacing between any two adjacent self-luminous pixels in the N self-luminous pixels is a second spacing.

The first spacing is the same as the second spacing.

In a possible implementation, the first pixel unit includes a first self-luminous pixel and a second self-luminous pixel, and further includes a third self-luminous pixel. A size of the second self-luminous pixel is twice a total size of the first self-luminous pixel and the third self-luminous pixel. N is 3, and N1 is 2.

In a possible implementation, a spacing between a total area occupied by the first self-luminous pixel and the third self-luminous pixel and an area occupied by the second self-luminous pixel is a third spacing.

The first spacing is the same as the third spacing.

It is assumed that the self-luminous array has X*Y*3 spatially-separated self-luminous pixels. If there is no pixel expansion apparatus, only X*Y full-color pixels can be actually displayed. According to the foregoing solution, due to existence of the pixel expansion apparatus and through the design, the frame rate is increased, so that display effect of X*Y*2 full-color pixels may be displayed. In addition, because the pixel expansion apparatus is of the thin flat plate structure, and does not clearly occupy the volume, the small volume of the optical engine may be ensured. In this way, the small-volume high-resolution display module is implemented.

In a possible implementation, the first pixel unit includes the first self-luminous pixel and the second self-luminous pixel, and the first self-luminous pixel and the second self-luminous pixel are sequentially set in a specified direction.

A shift direction of the second light beam relative to the first light beam is the specified direction.

In a possible implementation, a rotation angle of the transparent flat plate in the second state relative to the transparent flat plate in the first state is a specified angle. The specified angle and the first spacing meet the following condition:

$$\Delta y = d \sin\theta\left(1 - \sqrt{\frac{1-\sin^2\theta}{n^2-\sin^2\theta}}\right),$$

where $\Delta y$ represents the first spacing, $\theta$ represents the specified angle, d represents a thickness of the transparent flat plate, and n represents a refractive index of the transparent flat plate.

According to a third aspect, an embodiment of this application further provides an imaging method. The method is applied to a display module. The display module includes a self-luminous array, a pixel expansion apparatus, and a lens of an optical engine. The self-luminous array includes a plurality of self-luminous pixels. The pixel expansion apparatus includes a driver and a transparent flat plate. The method includes the following steps.

The plurality of self-luminous pixels of the self-luminous array respectively emit light beams, and the light beams are imaged on an imaging plane of the lens of the optical engine through the transparent flat plate. A color of a light beam emitted by a first self-luminous pixel of the plurality in self-luminous pixels is different from a color of a light beam emitted by a second self-luminous pixel. The first self-luminous pixel is adjacent to the second self-luminous pixel.

The transparent flat plate is driven by the driver to rotate in a time-division manner, so that a first area on the imaging plane of the lens of the optical engine displays different colors in a time-division manner, and the first area is any unit imaging area in an imaging area of the imaging plane.

In a possible implementation, N self-luminous pixels in the self-luminous array form one pixel unit. The N self-luminous pixels include at least two self-luminous pixels that emit light beams of different colors. N is a positive integer greater than 2.

The method further includes the following steps.

The driver controls, in a time-division manner, rotation of the transparent flat plate in a rotation periodicity of the transparent flat plate, so that the transparent flat plate switches between N1 states, and the first area on the imaging plane displays colors of N self-luminous pixels of a first pixel unit in a time-division manner. N1 is a positive integer less than or equal to N.

The first pixel unit is one pixel unit included in the self-luminous array.

In a possible implementation, the rotation periodicity includes a first time unit and a second time unit.

That the driver controls, in a time-division manner, rotation of the transparent flat plate in a rotation periodicity of the transparent flat plate includes:

- in the first time unit, the driver drives the transparent flat plate to rotate to be in a first state, so that the transparent flat plate outputs a first light beam; and
- in the second time unit, the driver drives the transparent flat plate to rotate to be in a second state, so that the transparent flat plate outputs a second light beam.

The first state and the second state are two states in N states. The first time unit is adjacent to the second time unit. A spacing between the first light beam and the second light beam is a first spacing. The first spacing is related to sizes of the N self-luminous pixels included in the first pixel unit.

In a possible implementation, a value of N1 is related to the sizes of the N self-luminous pixels included in the first pixel unit.

In a possible implementation, the sizes of the N self-luminous pixels included in the first pixel unit are the same. N1 is equal to N.

In a possible implementation, the sizes of the N self-luminous pixels included in the first pixel unit are the same. A spacing between any two adjacent self-luminous pixels in the N self-luminous pixels is a second spacing.

The first spacing is the same as the second spacing.

In a possible implementation, the first pixel unit includes the first self-luminous pixel and the second self-luminous pixel, and further includes a third self-luminous pixel. A size of the second self-luminous pixel is twice a total size of the first self-luminous pixel and the third self-luminous pixel. N is 3, and N1 is 2.

In a possible implementation, a spacing between a total area occupied by the first self-luminous pixel and the third self-luminous pixel and an area occupied by the second self-luminous pixel is a third spacing.

The first spacing is the same as the third spacing.

In a possible implementation, the first pixel unit includes the first self-luminous pixel and the second self-luminous pixel, and the first self-luminous pixel and the second self-luminous pixel are sequentially set in a specified direction.

A shift direction of the second light beam relative to the first light beam is the specified direction.

In a possible implementation, a rotation angle of the transparent flat plate in the second state relative to the transparent flat plate in the first state is a specified angle. The specified angle and the first spacing meet the following condition:

$$\Delta y = d\sin\theta\left(1 - \sqrt{\frac{1-\sin^2\theta}{n^2-\sin^2\theta}}\right),$$

where $\Delta y$ represents the first spacing, $\theta$ represents the specified angle, d represents a thickness of the transparent flat plate, and n represents a refractive index of the transparent flat plate.

For beneficial effect of the second aspect to the third aspect, refer to descriptions of related beneficial effect of the first aspect. Details are not described again.

DESCRIPTION OF EMBODIMENTS

To make the objectives, technical solutions, and advantages of this application clearer, the following further describes this application in detail with reference to the accompanying drawings. In the descriptions of this application, unless otherwise specified, "a plurality of" means two or more than two.

This application provides a display module. The display module may be used in an augmented reality (AR) device, for example, AR glasses or an AR helmet. The display module may be further used in a display device such as a camera.

For information display, AR is no longer limited to a physical screen, and display may be performed in entire physical space. Augmented reality display means displaying virtual information in real time based on a physical entity in a manner of combining virtuality and reality. Second, for human-computer interaction, instruction collection may break through a physical operation interface, and use a more natural and convenient interaction manner, such as a voice, a gesture, and an image, so that a human-computer interaction mode is more like natural communication with a person. The AR device may be used in various fields, such as industry, training, education, video watching, medical care, and games. In some embodiments, the display module provided in an embodiment of this application may be used in an optical engine of the AR device.

Figures 1, 2A:
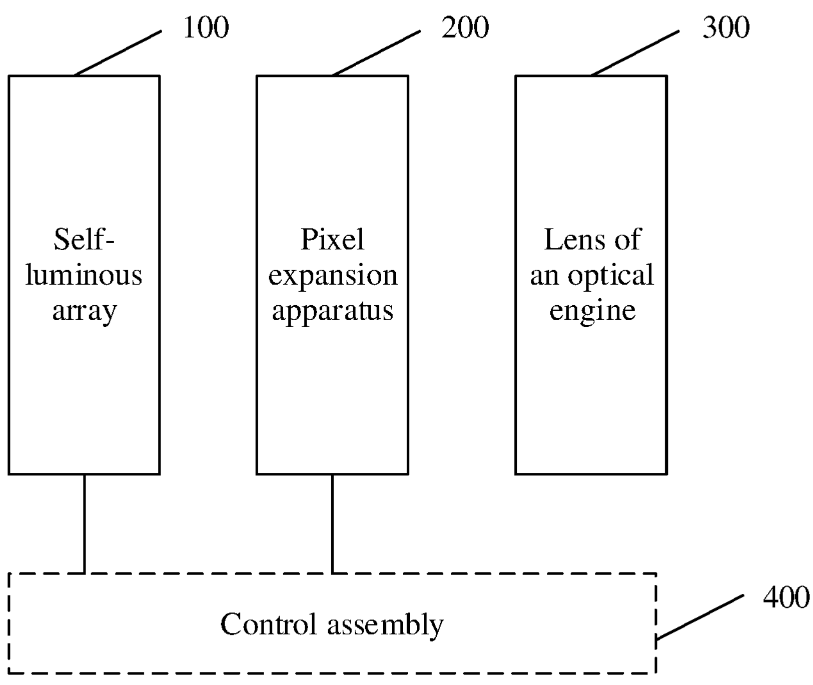
FIG. 1 is a schematic diagram of a structure of a display module according to an embodiment of this application.
FIG. 2A is a first arrangement manner of self-luminous pixels in a self-luminous array according to an embodiment of this application.

As shown in FIG. 1, a display module provided in an embodiment of this application may include a self-luminous array 100, a pixel expansion apparatus 200, and a lens 300 of an optical engine. The self-luminous array 100 is configured to generate a light beam, and the light beam is transmitted to the pixel expansion apparatus 200. The pixel expansion apparatus 200 is mainly configured to refract the light beam input by the self-luminous array 100. The lens 300 of the optical engine is configured to image, on an imaging plane, a light beam refracted by the pixel expansion apparatus. That is, the light beam emitted by the self-luminous array 100 is imaged on the imaging plane of the lens of the optical engine by using the pixel expansion apparatus 200. The pixel expansion apparatus 200 can switch between a plurality of states. When switching between different states, the pixel expansion apparatus 200 may shift, to different degrees, the light beam input by the self-luminous array 100. It may be understood that, in different states of the pixel expansion apparatus 200, the light beam input by the self-luminous array 100 is output from different locations after passing through the pixel expansion apparatus 200.

In some embodiments, the display module may further include a control assembly 400, and the control assembly 400 controls state switching of the pixel expansion apparatus 200.

The following describes the functional assemblies and structures in FIG. 1, to provide an example implementation.

The following first describes the self-luminous array 100. The self-luminous array 100 may include a plurality of self-luminous pixels. Each self-luminous pixel can autonomously emit light. Each self-luminous pixel may be used as an independent point light source. In some embodiments, each independent point light source may be used as an imaging optical switch, and each imaging optical switch is controlled by a display signal, so that each pixel is separately addressed and driven to be lit up. The self-luminous array 100 may be an imaging chip that autonomously emits light, and is on an object surface of the entire optical system. The self-luminous array may be implemented through a spatially-separated display panel, and the display panel may be implemented by using a mini LED, a micro LED, a mini OLED, a micro OLED, or the like. The self-luminous array may also be referred to as a color active light-emitting pixel array, or may be referred to as an active light-emitting array for short. A name for the self-luminous array is not specifically limited in embodiments of this application. In an example, the self-luminous array 100 may be a spatially-separated full-color active light-emitting micro display chip. The plurality of self-luminous pixels in the self-luminous array 100 may form a plurality of pixel units. Each pixel unit may be considered as a full-color RGB pixel. Each pixel unit includes at least two self-luminous pixels that emit different colors.

In some embodiments, a size of each self-luminous pixel in the self-luminous array 100 may be less than 10 μm. For example, the size of the self-luminous pixel is at a nanometer level. In an embodiment of this application, the self-luminous array is used as an image source, and an image on a panel of the self-luminous array is projected through the lens of the optical engine. Because elements such as a light source, a homogenizer, and a prism are not required, a system of the optical engine may be simplified, and a volume of the optical engine may be reduced, so that an optical engine with an extremely small volume is implemented, and may be used in an AR display device with limited space.

Figure 2B:
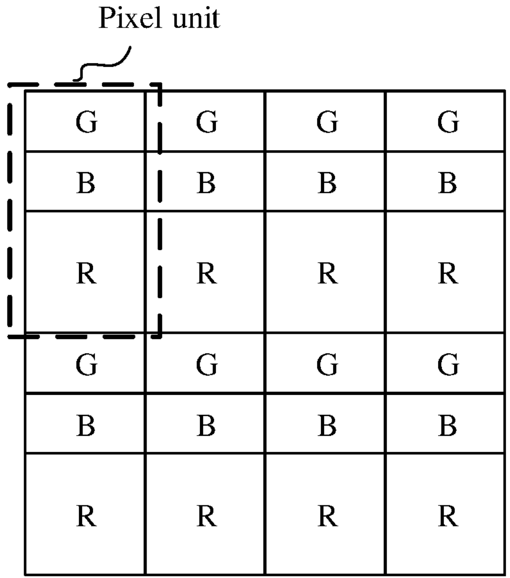
FIG. 2B is a second arrangement manner of self-luminous pixels in a self-luminous array according to an embodiment of this application.
Figure 2C:
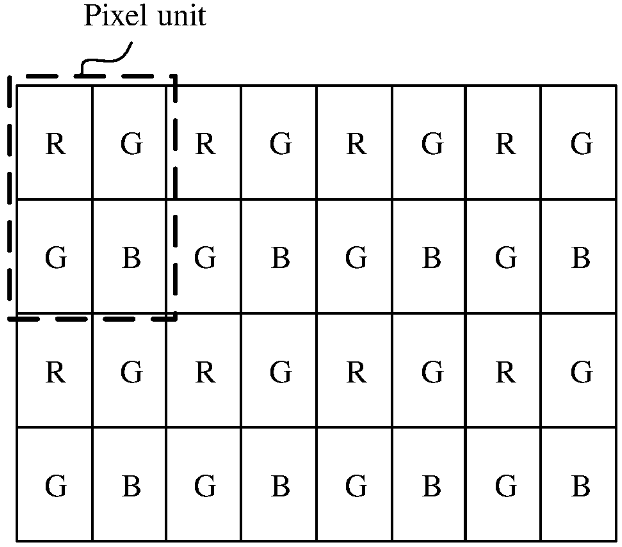
FIG. 2C is a third arrangement manner of self-luminous pixels in a self-luminous array according to an embodiment of this application.

In an example, an arrangement of the self-luminous pixels in the self-luminous array 100 may be an RGB arrangement, an RGBG arrangement, an RGBW arrangement, or the like. An arrangement manner of the self-luminous pixels in the self-luminous array is not specifically limited in this application. FIG. 2A to FIG. 2D shows examples of three arrangement manners of the self-luminous pixels in the self-luminous array 100. Each grid in FIG. 2A to FIG. 2C represents one self-luminous pixel.

FIG. 2A shows an example of an RGB arrangement manner, that is, an arrangement in a long strip shape. R represents a red self-luminous pixel, G represents a green self-luminous pixel, and B represents a blue self-luminous pixel. Sizes of the red self-luminous pixel, the green self-luminous pixel, and the blue self-luminous pixel are all the same. The RGB arrangement manner may mean that RGB three components are arranged to form one pixel unit, and the self-luminous array 100 includes repetitions of a plurality of pixel units.

FIG. 2B shows an example of another RGB arrangement manner, where sizes of a red self-luminous pixel, a green self-luminous pixel, and a blue self-luminous pixel are not completely same. In the example of FIG. 2B, a size of the red self-luminous pixel is twice a size of the green self-luminous pixel and twice a size of the blue self-luminous pixel. In FIG. 2B, RGB three components are arranged to form one pixel unit, and the self-luminous array 100 includes repetitions of a plurality of pixel units.

FIG. 2C shows an example of an RGBG arrangement manner. Each pixel unit includes one red self-luminous pixel, two green self-luminous pixels, and one blue self-luminous pixel. Sizes of the self-luminous pixels are the same. In some embodiments, one red self-luminous pixel and one green self-luminous pixel may form one pixel unit, and one blue self-luminous pixel and one green self-luminous pixel may form another pixel unit.

Figure 2D:
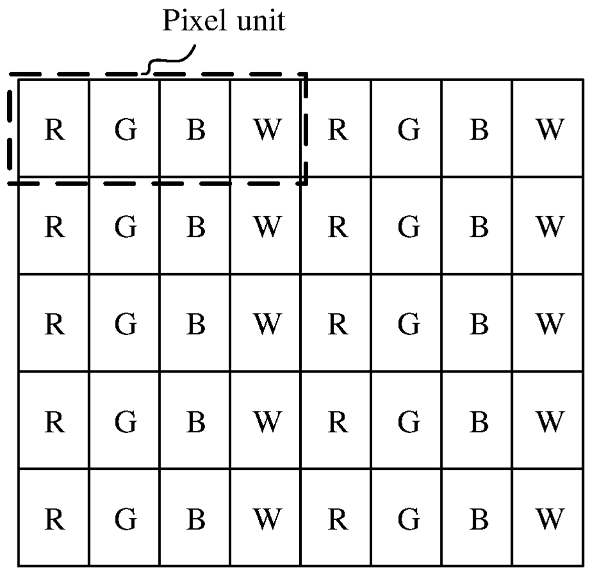
FIG. 2D is a fourth arrangement manner of self-luminous pixels in a self-luminous array according to an embodiment of this application.

FIG. 2D shows an example of an RGBW arrangement manner. Each pixel unit includes a red self-luminous pixel, a blue self-luminous pixel, a green self-luminous pixel, and a white self-luminous pixel. Sizes of the self-luminous pixels are the same. In some embodiments, one red self-luminous pixel and one green self-luminous pixel may form one pixel unit, and one blue self-luminous pixel and one green self-luminous pixel may form another pixel unit.

Figure 3:
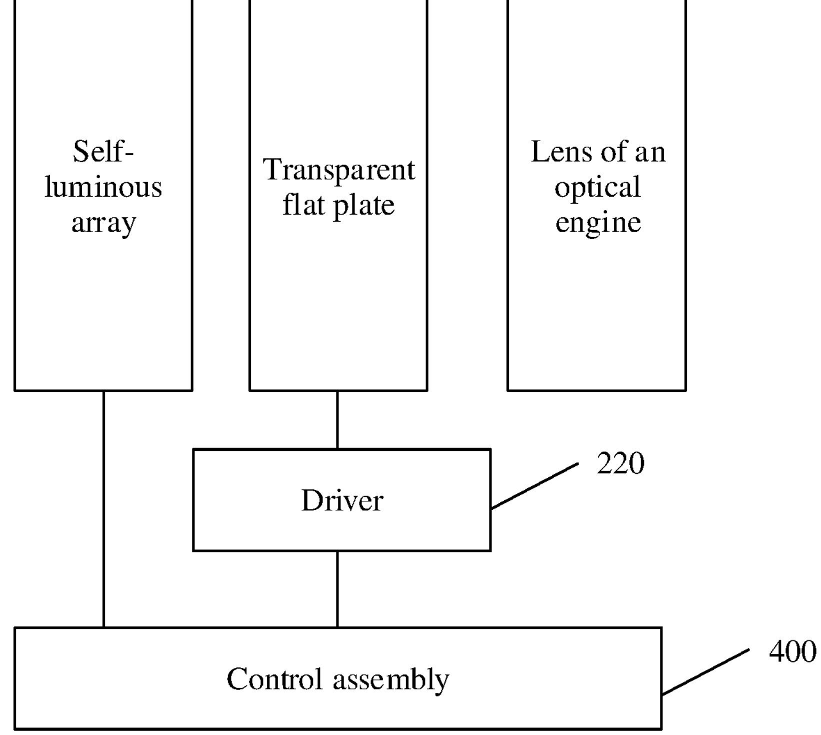
FIG. 3 is a schematic diagram of a structure of another display module according to an embodiment of this application.

The following describes the pixel expansion apparatus 200 in an embodiment of this application. The pixel expansion apparatus 200 in this application is of a mechanical structure, and may be of an electrically-driven vibrating mirror structure. FIG. 3 shows an example of a structure of the pixel expansion apparatus 200. The pixel expansion apparatus 200 may include a transparent flat plate 210. The transparent flat plate 210 is a core of the pixel expansion apparatus 200. The pixel expansion apparatus 200 further includes a driver 220. The transparent flat plate 210 may have a plurality of states. The driver 220 in the pixel expansion apparatus 200 drives rotation of the transparent flat plate 210, so that the transparent flat plate 210 switches between the plurality of states. The transparent flat plate 210 may be made of a glass material, a plastic material, or another material that can refract a light beam.

Figure 4:
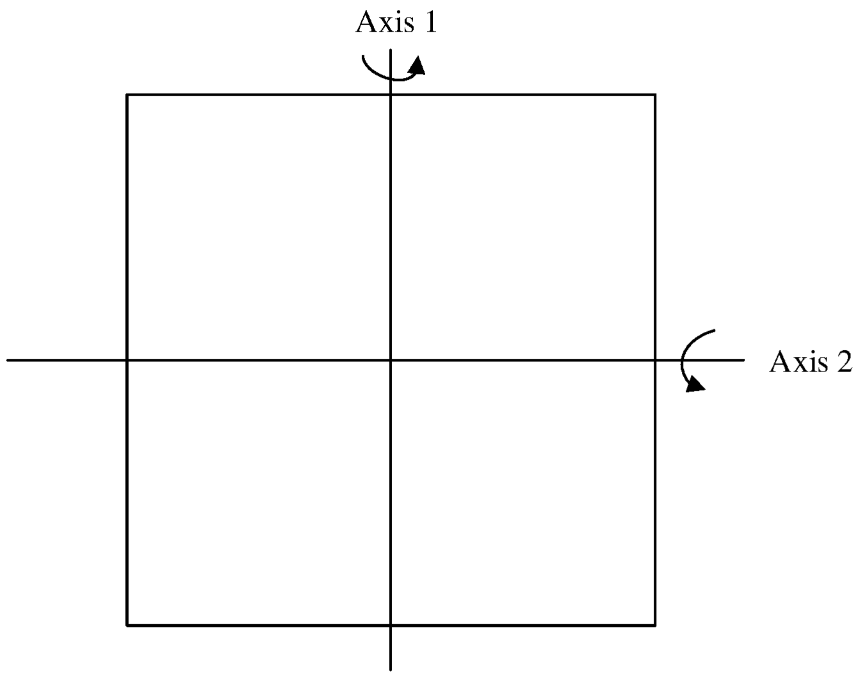
FIG. 4 is a schematic diagram of a rotation axis of a transparent flat plate according to an embodiment of this application.

When switching to different states, the transparent flat plate 210 may shift, to different degrees, a light beam input by the self-luminous array 100. It may be understood that, in different states of the transparent flat plate 210, the light beam input by the self-luminous array 100 is output from different locations of the transparent flat plate 210. In some embodiments, the transparent flat plate 210 has two rotation axes, for example, a first rotation axis and a second rotation axis. The driver 220 may drive the transparent flat plate 210 to rotate by using the first rotation axis as an axis, or the driver 220 may drive the transparent flat plate 210 to rotate by using the second rotation axis as an axis. For example, as shown in FIG. 4, an axis 1 may be understood as the first rotation axis, and an axis 2 may be understood as the second rotation axis.

An edge of the transparent flat plate 210 has a structure that may receive an electrical signal, or is made of a material that can receive an electrical signal. The transparent flat plate 210 can rotate by different angles in response to driving of the driver 220.

In some embodiments, the pixel expansion apparatus 200 may further include another assembly, for example, a bearing assembly, which is not shown in FIG. 3. The bearing assembly bears and fastens the transparent flat plate 210. Optionally, the bearing assembly may be driven by the driver 220 to rotate, to enable the transparent flat plate 210 to rotate.

In a possible example, the driver 220 drives the transparent flat plate 210 to perform a rotation operation, so that after being refracted by the transparent flat plate 210, the light beam emitted by the self-luminous array 100 is shifted relative to a previous state, to display different colors in a unit imaging area on an imaging plane of the lens 300 of the optical engine. The unit imaging area may be understood as an area that is in an imaging area of the lens of the optical engine and that is occupied by one self-luminous pixel in one pixel unit. It should be noted that a size of the unit imaging area is related to a size of the self-luminous pixel, and sizes of unit imaging areas corresponding to self-luminous pixels of different sizes are different. In some embodiments, when the self-luminous array 100 is arranged in the RGB arrangement manner shown in FIG. 2A, one unit imaging area may be understood as a size of an area that is in the imaging area of the imaging plane of the lens of the optical engine and that is occupied by one self-luminous pixel. In some other embodiments, when the self-luminous array 100 is arranged in the RGB arrangement manner shown in FIG. 2B, the unit imaging area may be understood as an area that is in the imaging area of the imaging plane of the lens of the optical engine and that is occupied by a red self-luminous pixel, or a size of an area that is in the imaging area of the imaging plane of the lens of the optical engine and that is occupied by a blue self-luminous pixel, or an area that is in the imaging area of the imaging plane of the lens of the optical engine and that is occupied by a green self-luminous pixel. It should be understood that sizes of unit imaging areas corresponding to self-luminous pixels of a same size are generally the same.

In some embodiments, the transparent flat plate 210 is driven by the driver 220 to rotate, so that a spacing between light beams emitted in two adjacent time units is a specified shift spacing. For ease of description, the specified shift spacing may be referred to as a first spacing. The first spacing is related to sizes of N self-luminous pixels included in a first pixel unit.

For example, the two adjacent time units are respectively a first time unit and a second time unit. In the first time unit, when the transparent flat plate 210 is driven by the driver 220 to rotate to be in a first state, the transparent flat plate 210 outputs a first light beam. In the second time unit, when the transparent flat plate is driven by the driver to rotate to be in a second state, the transparent flat plate outputs a second light beam. The first state and the second state are two states in states supported by the transparent flat plate. A spacing between the first light beam and the second light beam is the first spacing.

For example, the N self-luminous pixels include two self-luminous pixels that are adjacent in a specified direction. The two self-luminous pixels are respectively a first self-luminous pixel and a second self-luminous pixel, and sizes of the two self-luminous pixels are the same. When the two self-luminous pixels need to be imaged in a same unit imaging area in the first time unit and the second time unit, the transparent flat plate 210 is driven by the driver 220 to rotate, so that compared with the light beam output in the first time unit, the light beam output by the transparent flat plate 210 in the second time unit is shifted by the first spacing in the specified direction. A spacing between the first self-luminous pixel and the second self-luminous pixel is referred to as a second spacing, and the first spacing is equal to the second spacing.

For another example, the pixel unit includes at least three self-luminous pixels: the first self-luminous pixel, the second self-luminous pixel, and a third self-luminous pixel. A size of the second self-luminous pixel is twice a total size of the first self-luminous pixel and the third self-luminous pixel. An area occupied by the second self-luminous pixel and an area occupied by the first self-luminous pixel and the third self-luminous pixel are adjacent in the specified direction. When the three self-luminous pixels need to be imaged in a same unit imaging area in the first time unit and the second time unit, the transparent flat plate 210 is driven by the driver 220 to rotate, so that compared with the light beam output in the first time unit, the light beam output by the transparent flat plate 210 in the second time unit is shifted by the first spacing in the specified direction. A spacing between the total area occupied by the first self-luminous pixel and the third self-luminous pixel and the area occupied by the second self-luminous pixel is referred to as a third spacing, and the first spacing is equal to the third spacing. In the first time unit, after passing through the transparent flat plate 210, a light beam emitted by the first self-luminous pixel is imaged on a first unit imaging area of the imaging plane of the lens 300 of the optical engine, and after passing through the transparent flat plate 210, a light beam emitted by the third self-luminous pixel is imaged on a second unit imaging area of the imaging plane of the lens 300 of the optical engine. In the second time unit, after passing through the transparent flat plate 210, a light beam emitted by the second self-luminous pixel is imaged on a third unit imaging area of the imaging plane of the lens 300 of the optical engine. A size of an area obtained by superimposing the first unit imaging area and the third unit imaging area and a size of the third unit imaging area are the same.

In some embodiments, the transparent flat plate 210 may periodically switch between the plurality of states. It should be noted that, a quantity of states between which the transparent flat plate 210 can switch may be the same as a quantity of states that are periodically switched, or a quantity of states between which the transparent flat plate 210 can switch is greater than a quantity of states that need to be periodically switched. Specifically, a state that needs to be periodically switched may be determined based on an actual requirement. In this embodiment of this application, the periodicity is referred to as a rotation periodicity of the transparent flat plate 210. The rotation periodicity may include a plurality of time units, and the plurality of time units have same duration. The plurality of time units are in a one-to-one correspondence with the plurality of states that need to be switched. For example, the rotation periodicity includes three time units: the first time unit, the second time unit, and a third time unit. In the first time unit, the transparent flat plate 210 is in the first state. In the second time unit, the transparent flat plate 210 rotates to be in the second state. In the third time unit, the transparent flat plate 210 rotates to be in a third state.

For example, a quantity of states between which the transparent flat plate 210 needs to switch may be determined based on a quantity of self-luminous pixels included in each pixel unit, and may further be determined based on the sizes of the self-luminous pixels included in the pixel unit. For example, the quantity of self-luminous pixels included in each pixel unit is N. In the rotation periodicity, the driver 220 may control, in a time-division manner, rotation of the transparent flat plate 210, and the transparent flat plate 210 switches between N1 states, so that the unit imaging area on the imaging plane displays colors of N self-luminous pixels of one pixel unit in a time-division manner. N1 is a positive integer less than or equal to N.

In some embodiments, a value of N1 is related to sizes of the N self-luminous pixels included in the pixel unit. For example, when sizes of the N self-luminous pixels in the pixel unit are all the same, N1 may be equal to N. The driver 220 enables the transparent flat plate 210 to switch between the N states in N time units of the rotation periodicity, so that the N self-luminous pixels included in the pixel unit may be imaged in a same unit imaging area of the imaging plane of the lens 300 of the optical engine in the N time units. For example, the self-luminous array 100 is arranged in the arrangement manner shown in FIG. 2A, where N=N1=3. For example, the self-luminous array 100 is arranged in the arrangement manners shown in FIG. 2C and FIG. 2D, where N=N1=4.

For another example, when the sizes of the N self-luminous pixels in the pixel unit are not completely consistent. For example, in the arrangement manner of the self-luminous pixels shown in FIG. 2B, the size of the red self-luminous pixel is twice the size of the green self-luminous pixel and twice the size of the blue self-luminous pixel. That is, N=3, and N1 may be equal to 2. The driver 220 enables the transparent flat plate 210 to switch between two states in the two time units of the rotation periodicity, so that the green self-luminous pixel and the blue self-luminous pixel included in the pixel unit are imaged in a specified imaging area in the first time unit, and the red self-luminous pixel included in the pixel unit is also imaged in the specified imaging area in the first time unit. A size of the specified imaging area and a size of a unit imaging area corresponding to the red self-luminous pixel are the same. The size of the specified imaging area and a total size of a unit imaging area corresponding to the green self-luminous pixel and a unit imaging area corresponding to the blue self-luminous pixel are the same.

Figure 5:
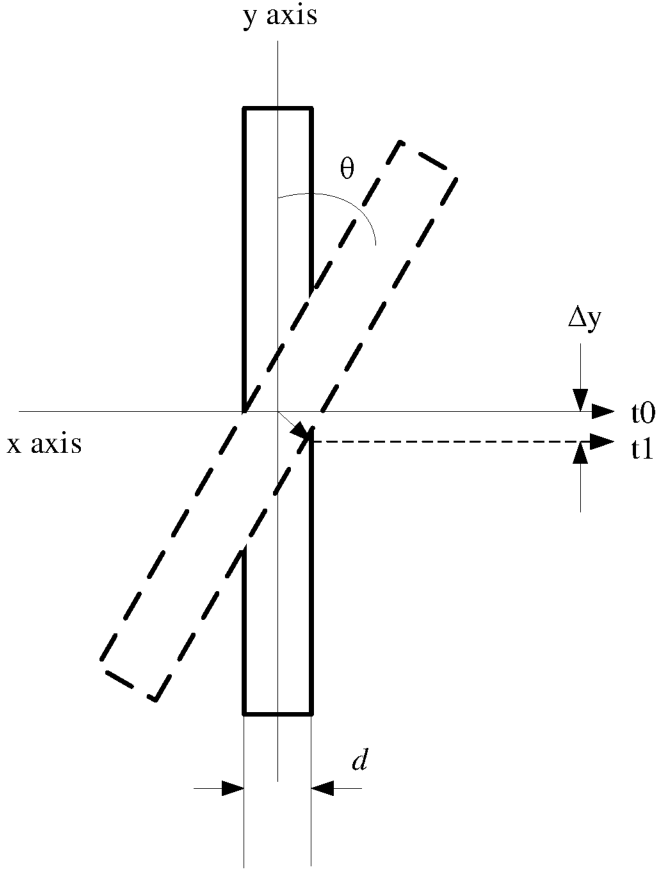
FIG. 5 is a schematic diagram of a principle of a pixel expansion apparatus according to an embodiment of this application.

FIG. 5 shows an example of a principle of the pixel expansion apparatus. For example, a thickness of the transparent flat plate 210 is d, and a refractive index is n. In FIG. 5, two states are used as an example. At a moment to, the transparent flat plate 210 is in the first state. At a moment t1, the transparent flat plate 210 is driven by the driver 220 to rotate clockwise by an angle θ to be in the second state. As shown in FIG. 5, in a time period from the moment t0 to the moment t1, the transparent flat plate 210 is in the first state, that is, the transparent flat plate 210 is parallel to a Y axis. At the moment t1, the transparent flat plate 210 is driven by the driver 220 to rotate clockwise by the angle θ to be in the second state, that is, an angle between the transparent flat plate 210 and the Y axis is θ. When the transparent flat plate 210 is in the first state, light that is propagated forward needs to comply with a refraction law when passing through the transparent flat plate 210. That is, a propagation direction of the light that passes through the transparent flat plate 210 is parallel to an X axis.

When the transparent flat plate 210 is in the second state, the propagation direction of the light that passes through the transparent flat plate 210 is parallel to an initial propagation direction, but there is a specific displacement Δy between the propagation direction and the X axis. That is, a spacing, in a Y-axis direction, between a location of a light beam actually output by the transparent flat plate 210 in the second state and a location of a light beam output in the initial propagation direction in the first state is Δy.

Figures 6, 7:
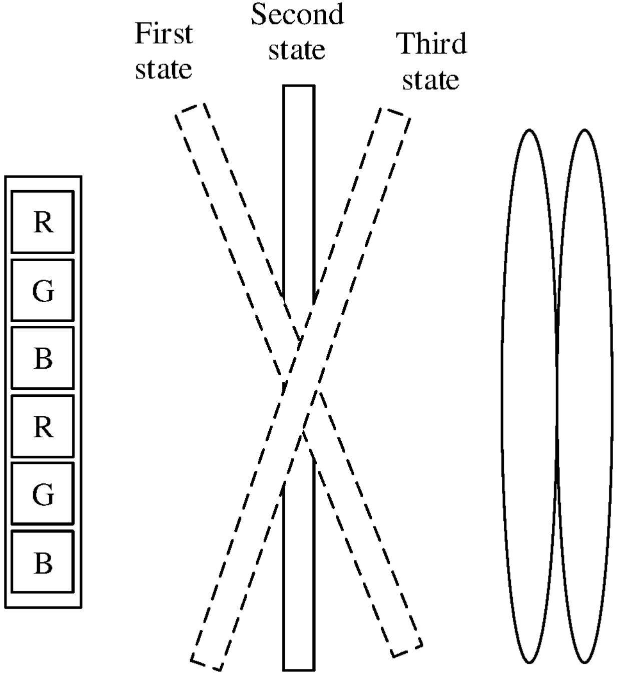
FIG. 6 is a schematic diagram of a shift of a pixel light beam according to an embodiment of this application.
FIG. 7 is a schematic diagram of a rotation status of a transparent flat plate according to an embodiment of this application.

It should be noted that, in FIG. 5, only an example in which, compared with a location of the light beam output by the transparent flat plate 210 in the first state, a location of the light beam output by the transparent flat plate 210 in the second state is shifted downward is used. As shown in FIG. 6, compared with a pixel location in the light beam that is of a self-luminous array and that is output by the transparent flat plate 210 in the second state, a pixel location in the light beam that is of the self-luminous array and that is output by the transparent flat plate 210 in the first state is shifted downward by Δy.

In some embodiments, upward shift, leftward shift, rightward shift, and the like are implemented by using the foregoing principle.

A rotation angle of the transparent flat plate 210 in the second state relative to the transparent flat plate 210 in the first state is a specified angle θ. The specified angle θ and a first spacing Δy meet a condition shown in the following formula (1):

$$\Delta y = d\sin\theta\left(1 - \sqrt{\frac{1-\sin^2\theta}{n^2-\sin^2\theta}}\right), \qquad \text{Formula (1)}$$

where

Δy represents the first spacing, θ represents the specified angle, and d represents a thickness of the transparent flat plate.

In a possible implementation, in an embodiment of this application, a shift spacing of the light beam in different states may be determined based on a size of a self-luminous pixel. For example, the refractive index, the thickness, and the rotation angle of the transparent flat plate 210 may be properly designed, to implement the shift spacing of the light beam in different states.

The following describes a lens of an optical engine. The lens 300 of the optical engine may include one or more lenses, and is configured to image, on an imaging plane, a light beam output by a transparent flat plate 210, so that human eyes can see an image.

In a possible implementation, a control assembly 400 may be, for example, a processor, a microprocessor, controller, or another control assembly, for example, may be a general-purpose central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof.

It should be understood that, when a self-luminous pixel is small enough, the human eyes generally cannot distinguish spatial separation of the self-luminous pixels, and a plurality of self-luminous pixels (for example, one pixel unit) may be considered as one full-color pixel, to implement full-color display. At present, in an AR optical engine, a color self-luminous array is used as a display panel, and then projection is directly performed through the lens of the optical engine. Due to a spatially separated self-luminous array structure, the human eyes cannot distinguish the self-luminous pixels. Therefore, one pixel unit is considered as one full-color pixel. For example, a self-luminous array arranged in the RGB arrangement shown in FIG. 2A is used as an example, and RGB three self-luminous pixels are considered as one pixel. Consequently, real display resolution is ⅓ of resolution of the self-luminous array, and a resolution loss is caused. Therefore, when the size of the self-luminous pixel is specified (a minimum size of a subpixel is generally limited by a processing process and performance), actual display resolution may be additionally sacrificed (for example, when there are 1920*1080 pixels, only resolution of 1920*1080/3 can be actually displayed), and in addition, additional self-luminous pixels may be added (for example, 1920*1080*3 pixels are used to display resolution of 1920*1080). However, when the size of the self-luminous pixel cannot be reduced, a size of the entire self-luminous array is increased, and a volume of the optical engine is further increased. In addition, in a solution provided in this embodiment of this application, the driver drives, in a time-division manner, the transparent flat plate to rotate, so that a plurality of images are displayed in a time-division manner in each rotation periodicity. With persistence of vision function and a visual synthesis function of the human eyes, the human eyes can see a high-resolution image.

In some embodiments, the control assembly 400 may split a to-be-displayed image into a plurality of frames of images based on the to-be-displayed image, and then send, in a time-division manner, the plurality of frames of images to the self-luminous array 100 for display. In addition, the control assembly 400 controls, in a time-division manner, the transparent flat plate 210 to switch between a plurality of states, so that the transparent flat plate 210 outputs the plurality of frames of images in a time-division manner, and human eyes synthesize the plurality of frames of images into the to-be-displayed image by using the visual synthesis function. It should be noted that time-division display of the plurality of frames of images is synchronous with time-division control of the control assembly 400.

The following describes in detail a solution of an embodiment of this application with reference to specific application scenarios. For ease of description subsequently, numbers of assemblies are not described as examples.

Scenario 1: An example in which self-luminous pixels included in a self-luminous array 100 are arranged in the arrangement manner shown in FIG. 2A is used. As shown in FIG. 7, a transparent flat plate in a pixel expansion apparatus switches between three states. Sizes of the self-luminous pixels included in the self-luminous array are the same. An example in which spacings between any two adjacent self-luminous pixels are the same is used. The transparent flat plate in the pixel expansion apparatus is properly designed and driven based on a requirement, and may have three different rotation states. As shown in FIG. 7, the three rotation states may include a vertical state, a state in which the transparent flat plate rotates clockwise by a specified angle based on the vertical state, and a state in which the transparent flat plate rotates counterclockwise by a specified angle based on the vertical state. Each state corresponds to a different light emission location. For ease of description, the state in which the transparent flat plate rotates counterclockwise by the specified angle based on the vertical state is referred to as a first state, the vertical state is referred to as a second state, and the state in which the transparent flat plate rotates clockwise by the specified angle based on the vertical state is referred to as a third state. The three working states of the transparent flat plate are used, so that resolution may be enhanced by three times, and final full-color display resolution is consistent with physical pixel resolution of the self-luminous array.

Figure 8:
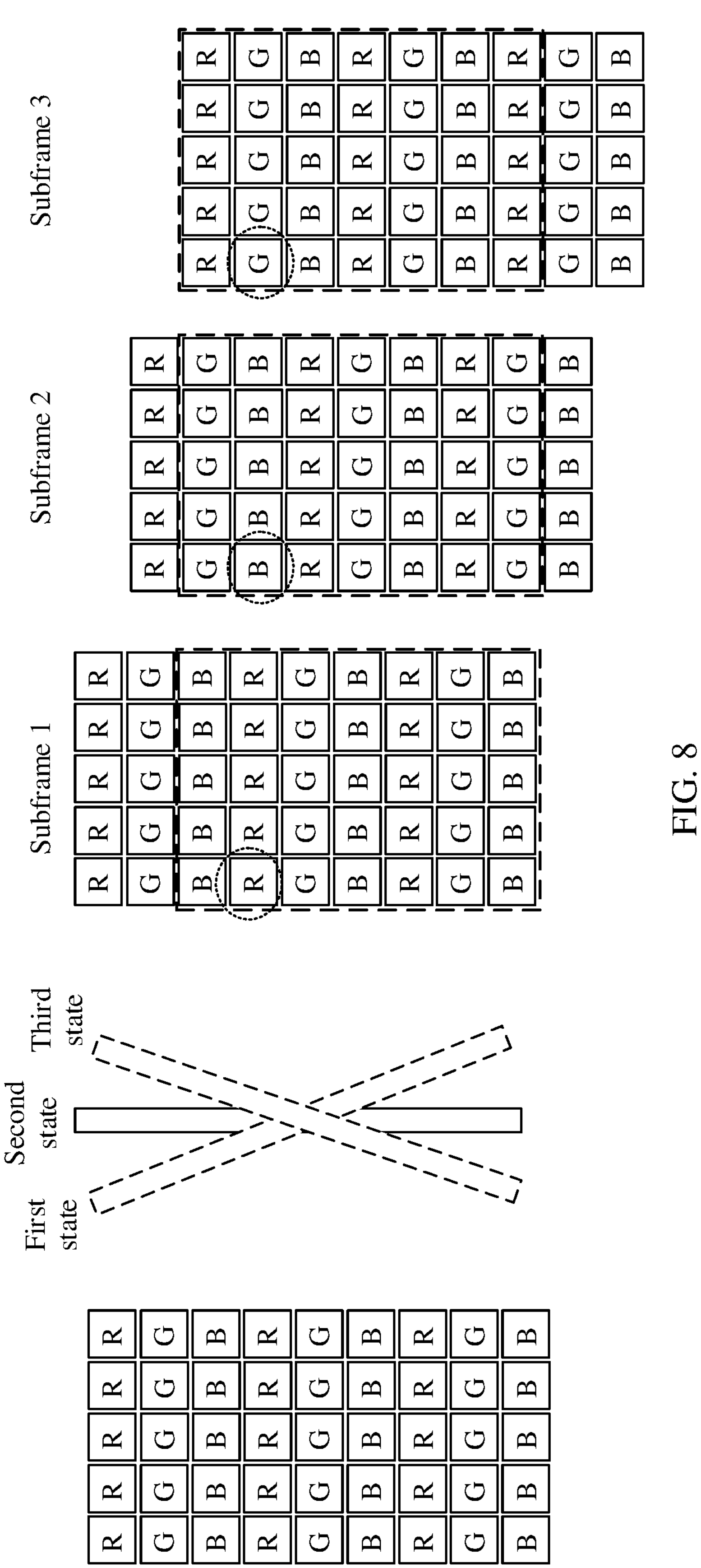
FIG. 8 is a schematic diagram of a shift location of an image of a light beam on an imaging plane according to an embodiment of this application.

An example in which resolution of a to-be-displayed image is M*N is used. The physical pixel resolution of the self-luminous array is M*N, that is, there are M*N self-luminous pixels. One to-be-displayed image is decomposed into three low-resolution subframes. The self-luminous array is arranged in the arrangement manner shown in FIG. 2A. An example in which a rotation periodicity of the transparent flat plate includes a first time unit, a second time unit, and a third time unit is used. As shown in FIG. 8, when a control assembly inputs a signal of a subframe 1 to the self-luminous array in the first time unit, the control assembly may synchronously control, by using a driver in the first time unit, the transparent flat plate to rotate counterclockwise to be in the first state, so that after being transmitted by the transparent flat plate and a lens of an optical engine, a light beam that is of the subframe 1 and that is emitted by the self-luminous array is imaged on an imaging plane. When the control assembly inputs a signal of a subframe 2 to the self-luminous array in the second time unit, the control assembly may synchronously control, by using the driver in the second time unit, the transparent flat plate to rotate clockwise to be in the vertical state, so that after being transmitted by the transparent flat plate, a light beam that is of the subframe 2 and that is emitted by the self-luminous array is shifted downward by a specific displacement (equal to a spacing between two self-luminous pixels) compared with the light beam of the subframe 1. Then, the light beam of the subframe 2 is imaged on the imaging plane through the lens of the optical engine, as shown in an image of the subframe 2 in FIG. 8. When the control assembly inputs a signal of a subframe 3 to the self-luminous array in the third time unit, the control assembly may synchronously control, by using the driver in the third time unit, the transparent flat plate to continue to rotate clockwise to be in the third state, so that after being transmitted by the transparent flat plate, a light beam that is of the subframe 3 and that is emitted by the self-luminous array continues to shift downward by the specific displacement (equal to the spacing between two self-luminous pixels) compared with the light beam of the subframe 2. Then, the light beam of the subframe 3 is imaged on the imaging plane through the lens of the optical engine, as shown in an image of the subframe 3 in FIG. 8.

A dashed box in FIG. 8 represents an imaging area of the imaging plane, and a square area circled in a circle may be understood as one unit imaging area. When the subframe 1 is displayed in the first time unit, the unit imaging area circled in the circle displays a color of a red self-luminous pixel. When the subframe 2 is displayed in the second time unit, the pixel expansion apparatus is in the vertical state. In this case, all pixel light is shifted downward by a specific displacement in a vertical direction as a whole compared with a case of the subframe 1. In this case, the unit imaging area circled in the circle changes to be in a color of a blue self-luminous pixel that is translated from an adjacent location to this location. When the subframe 3 is displayed in the third time unit, the pixel expansion apparatus continues to rotate clockwise by an appropriate angle to be in the third state. In this case, all pixel light continues to shift downward by a specific displacement in the vertical direction as a whole compared with a case of the subframe 2. In this case, the unit imaging area circled in the circle changes to be in a color of a green self-luminous pixel that is translated from an adjacent location to this location.

It can be learned that, at a fixed display location (that is, the unit imaging area), the subframes 1, 2, and 3 respectively display the colors of the red, blue, and green self-luminous pixels. If a subframe switching speed is fast enough, human eyes cannot recognize a translation change of the pixel light, so that the human eyes see a color pixel at this pixel location. Based on this, in this application, in a time dimension, a same unit imaging area displays different colors in a time-division manner, and in a space dimension, a shift of the light beam is controlled, so that a high-resolution full-color image is implemented without increasing a volume of the optical engine.

It is assumed that the self-luminous array has 1920*1080 spatially separated RGB pixels. If there is no pixel expansion apparatus, only 1920*1080/3 full-color pixels can be actually displayed. In an embodiment of this application, due to existence of the pixel expansion apparatus and through a design, a frame rate is increased, so that display effect of 1920*1080 full-color pixels may be displayed. In addition, because the pixel expansion apparatus is of a thin flat plate structure, and does not clearly occupy a volume, a small volume of the optical engine may be ensured. In this way, a small-volume high-resolution display module is implemented.

Figure 9:
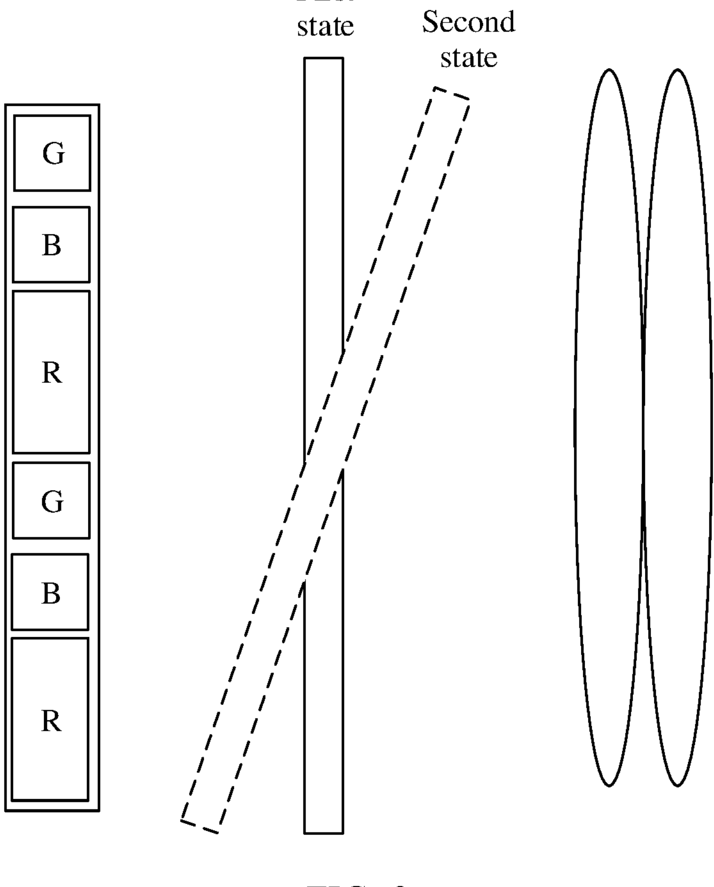
FIG. 9 is a schematic diagram of a rotation status of a transparent flat plate according to an embodiment of this application.

Scenario 2: An example in which self-luminous pixels included in a self-luminous array 100 are arranged in the arrangement manner shown in FIG. 2B is used. As shown in FIG. 9, a transparent flat plate in a pixel expansion apparatus switches between two states. A size of a red self-luminous pixel included in the self-luminous array is twice a size of a green self-luminous pixel and twice a size of a blue self-luminous pixel. The transparent flat plate in the pixel expansion apparatus is properly designed and driven based on a requirement, and may have two different rotation states. As shown in FIG. 9, the two rotation states may include a vertical state and a state in which the transparent flat plate rotates clockwise by a specified angle based on the vertical state. Each state corresponds to a different light emission location. For ease of description, the vertical state is referred to as a first state, and the state in which the transparent flat plate rotates clockwise by the specified angle is referred to as a second state. The two working states of the transparent flat plate are used, so that resolution may be enhanced by two times.

Figure 10:
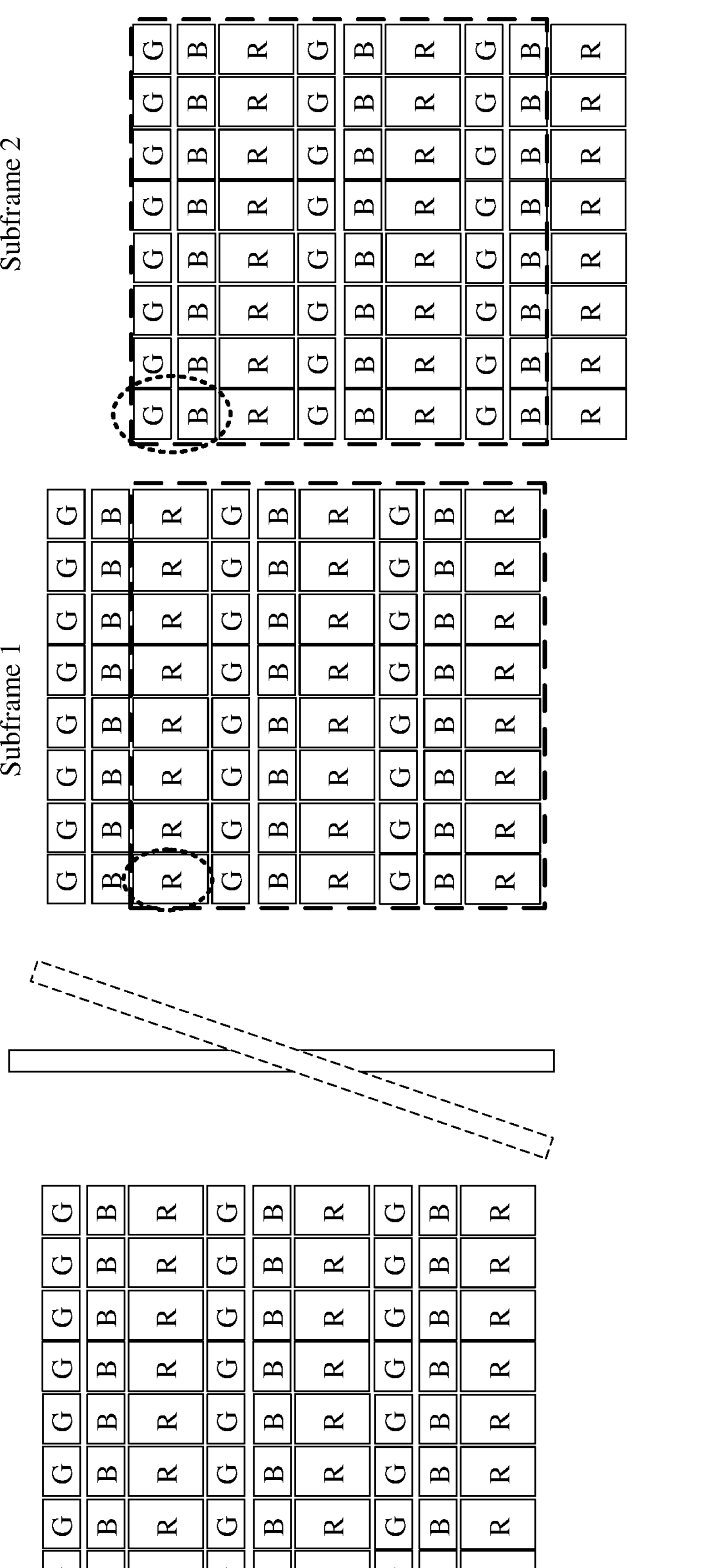
FIG. 10 is a schematic diagram of another shift location of an image of a light beam on an imaging plane according to an embodiment of this application.

An example in which resolution of a to-be-displayed image is M*N*2 is used. Physical pixel resolution of the self-luminous array is M*N*3, that is, there are M*N*3 self-luminous pixels. One to-be-displayed image is decomposed into two low-resolution subframes. The self-luminous array is arranged in the arrangement manner shown in FIG. 2B. An example in which a rotation periodicity of the transparent flat plate includes a first time unit and a second time unit is used. As shown in FIG. 10, when a control assembly inputs a signal of a subframe 1 to the self-luminous array in the first time unit, the control assembly may synchronously control, by using a driver in the first time unit, the transparent flat plate to rotate counterclockwise to be in the vertical state, so that after being transmitted by the transparent flat plate and a lens of an optical engine, a light beam that is of the subframe 1 and that is emitted by the self-luminous array is imaged on an imaging plane. When the control assembly inputs a signal of a subframe 2 to the self-luminous array in the second time unit, the control assembly may synchronously control, by using the driver in the second time unit, the transparent flat plate to rotate clockwise to be in the second state, so that after being transmitted by the transparent flat plate, a light beam that is of the subframe 2 and that is emitted by the self-luminous array is shifted downward by a specific displacement (equal to a spacing between two self-luminous pixels) compared with the light beam of the subframe 1. Then, the light beam of the subframe 2 is imaged on the imaging plane through the lens of the optical engine, as shown in an image of the subframe 2 in FIG. 10.

A dashed box in FIG. 10 represents an imaging area of the imaging plane, and a square area circled in a circle may be understood as one unit imaging area. When the subframe 1 is displayed in the first time unit, the pixel expansion apparatus is in the vertical state, and the unit imaging area circled in the circle displays colors of the blue self-luminous pixel and the green self-luminous pixel. When the subframe 2 is displayed in the second time unit, the pixel expansion apparatus rotates by a specific angle compared with the vertical state. In this case, all pixel light is shifted downward by a specific displacement in the vertical direction as a whole compared with a case of the subframe 1. In this case, the unit imaging area circled in the circle changes to be in a color of the red self-luminous pixel that is translated from an adjacent location to this location.

It can be learned that, at a fixed display location (that is, the unit imaging area), the subframes 1 and 2 respectively display the colors of the red, blue, and green self-luminous pixels. If a subframe switching speed is fast enough, human eyes cannot recognize a translation change of the pixel light, so that the human eyes see a color pixel at this pixel location. Based on this, in this application, in a time dimension, a same unit imaging area displays different colors in a time-division manner, and in a space dimension, a shift of the light beam is controlled, so that a high-resolution full-color image is implemented without increasing a volume of the optical engine.

It is assumed that the self-luminous array has 1920*1080*3 spatially separated RGB pixels. If there is no pixel expansion apparatus, only 1920*1080 full-color pixels can be actually displayed. In an embodiment of this application, due to existence of the pixel expansion apparatus and through a design, a frame rate is increased, so that display effect of 1920*1080*2 full-color pixels may be displayed. Therefore, compared with a case in which no pixel expansion apparatus is used, image resolution is improved by at least two times without increasing a size of the optical engine.

Scenario 3: An example in which self-luminous pixels included in a self-luminous array are arranged in the arrangement manner shown in FIG. 2C is used. As shown in FIG. 4, a transparent flat plate in a pixel expansion apparatus switches between four states. Sizes of the self-luminous pixels included in the self-luminous array are all the same. The transparent flat plate in the pixel expansion apparatus is properly designed and driven based on a requirement, and may have four different rotation states. The transparent flat plate has two rotation axes, namely, an axis 1 and an axis 2 as shown in FIG. 4. An example in which rotation along the axis 1 enables a light beam to shift to left and right, and rotation along the axis 2 enables the light beam to shift to up and down. The four working states of the transparent flat plate are used, so that resolution may be enhanced by three times, and because a structure of the self-luminous array arranged in the arrangement manner shown in FIG. 2C is used, display effect is enhanced.

Figure 11:
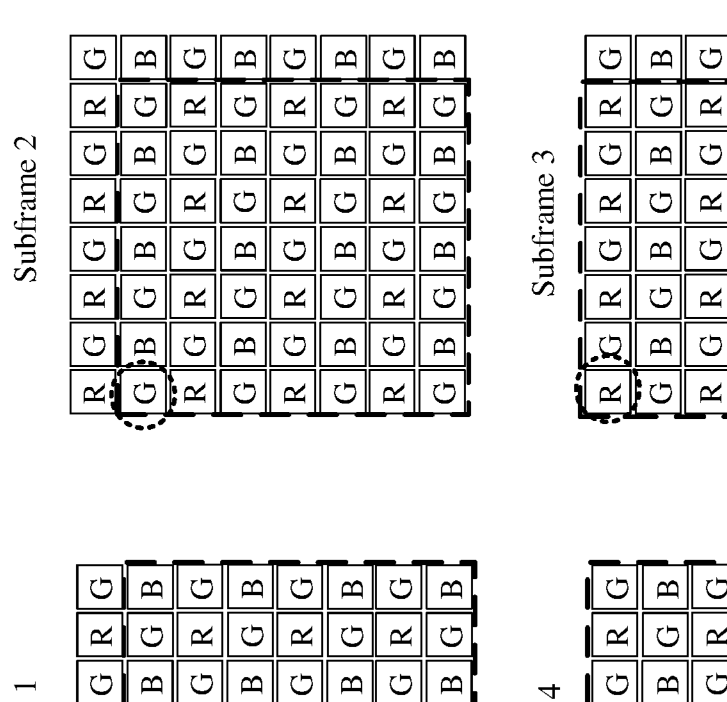
FIG. 11 is a schematic diagram of still another shift location of an image of a light beam on an imaging plane according to an embodiment of this application.

One to-be-displayed image is decomposed into four low-resolution subframes. The self-luminous array is arranged in the arrangement manner shown in FIG. 2C. An example in which a rotation periodicity of the transparent flat plate includes a first time unit, a second time unit, a third time unit, and a fourth time unit is used. As shown in FIG. 11, when a control assembly inputs a signal of a subframe 1 to the self-luminous array in the first time unit, the control assembly may synchronously control, by using a driver in the first time unit, the transparent flat plate to be in a first state, so that after being transmitted by the transparent flat plate and a lens of an optical engine, a light beam that is of the subframe 1 and that is emitted by the self-luminous array is imaged on an imaging plane. When the control assembly inputs a signal of a subframe 2 to the self-luminous array in the second time unit, the control assembly may synchronously control, by using the driver in the second time unit, the transparent flat plate to rotate along the axis 1 to be in a second state, so that after being transmitted by the transparent flat plate, a light beam that is of the subframe 2 and that is emitted by the self-luminous array is shifted rightward by a specific displacement (equal to a spacing between two self-luminous pixels) compared with the light beam of the subframe 1. Then, the light beam of the subframe 2 is imaged on the imaging plane through the lens of the optical engine, as shown in an image of the subframe 2 in FIG. 11.

When the control assembly inputs a signal of a subframe 3 to the self-luminous array in the third time unit, the control assembly may synchronously control, by using the driver in the third time unit, the transparent flat plate to rotate along the axis 2 to be in a third state, so that after being transmitted by the transparent flat plate, a light beam that is of the subframe 3 and that is emitted by the self-luminous array is shifted downward by a specific displacement (equal to the spacing between two self-luminous pixels) compared with the light beam of the subframe 2 or the subframe 1. Then, the light beam of the subframe 3 is imaged on the imaging plane through the lens of the optical engine, as shown in an image of the subframe 3 in FIG. 11.

When the control assembly inputs a signal of a subframe 4 to the self-luminous array in the fourth time unit, the control assembly may synchronously control, by using the driver in the third time unit, the transparent flat plate to rotate along the axis 1 to be in a fourth state, so that after being transmitted by the transparent flat plate, a light beam that is of the subframe 4 and that is emitted by the self-luminous array is shifted leftward by a specific displacement compared with the light beam of the subframe 3 and is shifted downward by a specific displacement (equal to the spacing between two self-luminous pixels) compared with the subframe 1. Then, the light beam of the subframe 4 is imaged on the imaging plane through the lens of the optical engine, as shown in an image of the subframe 4 in FIG. 11.

A dashed box in FIG. 11 represents an imaging area of the imaging plane, and a square area circled in a circle may be understood as one unit imaging area. When the subframe 1 is displayed in the first time unit, the unit imaging area circled in the circle displays a color of a blue self-luminous pixel. When the subframe 2 is displayed in the second time unit, the pixel expansion apparatus is in the vertical state. In this case, all pixel light is shifted rightward by a specific displacement in a horizontal direction as a whole compared with a case of the subframe 1. In this case, the unit imaging area circled in the circle changes to be in a color of a green self-luminous pixel that is translated from an adjacent location to this location. When the subframe 3 is displayed in the third time unit, the pixel expansion apparatus is in the third state. In this case, all pixel light is shifted downward by a specific displacement in a vertical direction as a whole compared with a case of the subframe 2. In this case, the unit imaging area circled in the circle changes to be in a color of a red self-luminous pixel that is translated from an adjacent location to this location. When the subframe 4 is displayed in the fourth time unit, the pixel expansion apparatus is in the fourth state. In this case, all pixel light is shifted leftward by a specific displacement in the horizontal direction as a whole compared with a case of the subframe 3. In this case, the unit imaging area circled in the circle changes to be in the color of the green self-luminous pixel that is translated from an adjacent location to this location.

It can be learned that, at a fixed display location (that is, the unit imaging area), the subframes 1, 2, 3, and 4 respectively display the colors of the blue, green, red, and green self-luminous pixels. If a subframe switching speed is fast enough, human eyes cannot recognize a translation change of the pixel light, so that the human eyes see a color pixel at this pixel location. Based on this, in this application, in a time dimension, a same unit imaging area displays different colors in a time-division manner, and in a space dimension, a shift of the light beam is controlled, so that a high-resolution full-color image is implemented without increasing a volume of the optical engine.

It is assumed that the self-luminous array has 1920*1080 spatially separated RGB pixels. If there is no pixel expansion apparatus, only 1920*1080/3 full-color pixels can be actually displayed. In an embodiment of this application, due to existence of the pixel expansion apparatus and through a design, a frame rate is increased, so that display effect of 1920*1080 full-color pixels may be displayed. In addition, because the pixel expansion apparatus is of a thin flat plate structure, and does not clearly occupy a volume, a small volume of the optical engine may be ensured. In this way, a small-volume high-resolution display module is implemented. In addition, because the human eyes are sensitive to green, an RGBG arrangement manner is used. A quantity of green self-luminous pixels is increased, so that a green color entering human eyes is enhanced, and thus display effect is enhanced.

Figure 12:
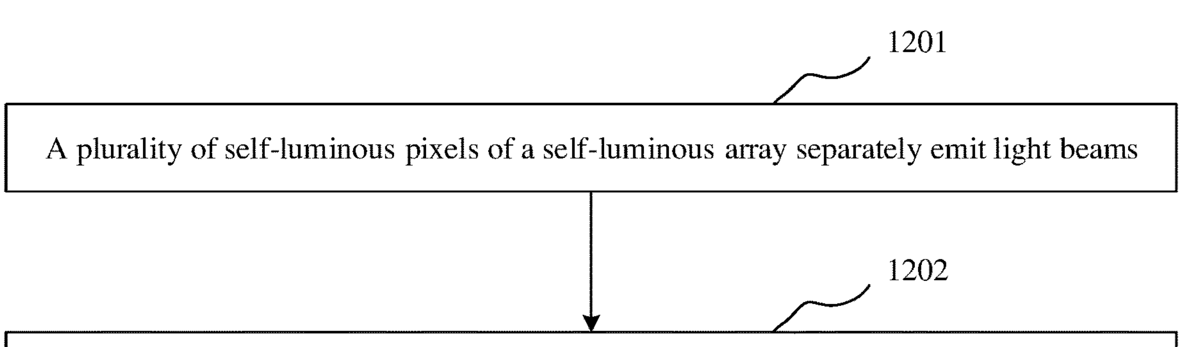
FIG. 12 is a schematic flowchart of an imaging method according to an embodiment of this application.

This application further provides an imaging method. FIG. 12 is a schematic flowchart of an example of an imaging method according to an embodiment of this application. The imaging method is applied to a display module. The display module includes a self-luminous array, a pixel expansion apparatus, and a lens of an optical engine. The self-luminous array includes a plurality of self-luminous pixels. The pixel expansion apparatus includes a driver and a transparent flat plate. The method includes the following steps.

1201: The plurality of self-luminous pixels of the self-luminous array respectively emit light beams.

1202: A light beam of the self-luminous array is imaged on an imaging plane of the lens of the optical engine through the transparent flat plate, where the transparent flat plate is driven by the driver to rotate in a time-division manner, so that a first area on the imaging plane of the lens of the optical engine displays different colors in a time-division manner.

A color of a light beam emitted by a first self-luminous pixel in the plurality of self-luminous pixels is different from a color of a light beam emitted by a second self-luminous pixel. The first self-luminous pixel is adjacent to the second self-luminous pixel. The first area is any unit imaging area in an imaging area of the imaging plane.

In a possible implementation, N self-luminous pixels in the self-luminous array form one pixel unit. The N self-luminous pixels include at least two self-luminous pixels that emit light beams of different colors. N is a positive integer greater than 2.

The method may further include the following steps.

The driver controls, in a time-division manner, rotation of the transparent flat plate in a rotation periodicity of the transparent flat plate, so that the transparent flat plate switches between N1 states, and the first area on the imaging plane displays colors of N self-luminous pixels of a first pixel unit in a time-division manner. N1 is a positive integer less than or equal to N.

The first pixel unit is one pixel unit included in the self-luminous array.

In a possible implementation, the rotation periodicity includes a first time unit and a second time unit. That the driver controls, in a time-division manner, rotation of the transparent flat plate in a rotation periodicity of the transparent flat plate may be implemented in the following manners.

In the first time unit, the driver drives the transparent flat plate to rotate to be in a first state, so that the transparent flat plate outputs a first light beam.

In the second time unit, the driver drives the transparent flat plate to rotate to be in a second state, so that the transparent flat plate outputs a second light beam.

The first state and the second state are two states in N states. The first time unit is adjacent to the second time unit. A spacing between the first light beam and the second light beam is a first spacing. The first spacing is related to sizes of the N self-luminous pixels included in the first pixel unit.

In a possible implementation, a value of N1 is related to the sizes of the N self-luminous pixels included in the first pixel unit.

In a possible implementation, the sizes of the N self-luminous pixels included in the first pixel unit are the same. N1 is equal to N.

In a possible implementation, the sizes of the N self-luminous pixels included in the first pixel unit are the same. A spacing between any two adjacent self-luminous pixels in the N self-luminous pixels is a second spacing.

The first spacing is the same as the second spacing.

In a possible implementation, the first pixel unit includes the first self-luminous pixel and the second self-luminous pixel, and further includes a third self-luminous pixel. A size of the second self-luminous pixel is twice a total size of the first self-luminous pixel and the third self-luminous pixel. N is 3, and N1 is 2.

In a possible implementation, a spacing between a total area occupied by the first self-luminous pixel and the third self-luminous pixel and an area occupied by the second self-luminous pixel is a third spacing.

The first spacing is the same as the third spacing.

In a possible implementation, the first pixel unit includes the first self-luminous pixel and the second self-luminous pixel, and the first self-luminous pixel and the second self-luminous pixel are sequentially set in a specified direction.

A shift direction of the second light beam relative to the first light beam is the specified direction.

In a possible implementation, a rotation angle of the transparent flat plate in the second state relative to the transparent flat plate in the first state is a specified angle. The specified angle and the first spacing meet the following condition:

$$\Delta y = d \sin\theta\left(1 - \sqrt{\frac{1-\sin^2\theta}{n^2-\sin^2\theta}}\right),$$

where $\Delta y$ represents the first spacing, $\theta$ represents the specified angle, d represents a thickness of the transparent flat plate, and n represents a refractive index of the transparent flat plate.

An embodiment of this application further provides a computer-readable storage medium. The computer-readable storage medium stores instructions. When the instructions are run on a computer or a processor, the computer or the processor is enabled to perform some or all steps performed by a control assembly in any embodiment of this application.

An embodiment of this application further provides a computer program product including instructions. When the computer program product is run on a computer or a processor, the computer or the processor is enabled to perform some or all steps performed by a control assembly in any embodiment of this application.

In various embodiments of this application, unless otherwise specified or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. "At least one of the following items (pieces)" or a similar expression thereof means any combination of these items, including any combination of singular items (pieces) or plural items (pieces). For example, at least one item (piece) of a, b, or c may indicate a, b, c, "a and b", "a and c", "b and c", or "a, b, and c", where a, b, and c may be singular or plural. In text descriptions of this application, a character "/" generally indicates an "or" relationship between the associated objects. In the formula of this application, the character "/" indicates a "division" relationship between the associated objects. In this application, a symbol "(a, b)" represents an open interval with a range greater than a and less than b, "[a, b]" represents a closed interval with a range greater than or equal to a and less than or equal to b, "(a, b]" represents a half-open and half-closed interval with a range greater than a and less than or equal to b, and "(a, b]" represents a half-open and half-closed interval with a range greater than a and less than or equal to b. In addition, in this application, a word "example" is used to represent giving an example, an illustration, or a description. Any embodiment or design solution described as an "example" in this application should not be construed as being more preferred or having more advantages than another embodiment or design solution. Alternatively, this may be understood as that the word "example" is used to present a concept in a specific manner, and does not constitute a limitation on this application.

It can be understood that various numbers in this application are merely used for differentiation for ease of description, and are not used to limit the scope of embodiments of this application. The sequence numbers of the foregoing processes do not mean execution sequences. The execution sequences of the processes should be determined based on functions and internal logic of the processes. Terms "first" and "second" and similar expressions are used to distinguish between similar objects but do not necessarily describe a specific order or sequence. In addition, terms "include", "contain", and any variant thereof are intended to cover a non-exclusive inclusion. For example, a series of steps or units are included. A method, a system, a product, or a device is not necessarily limited to clearly listed steps or units, but may include other steps or units that are not clearly listed and that are inherent to the process, the method, the product, or the device.

Although this application is described with reference to specific features and embodiments thereof, it is clear that various modifications and combinations may be made to them without departing from the spirit and scope of this application. Correspondingly, this specification and the accompanying drawings are merely example descriptions of solutions defined by the appended claims, and are considered as any or all modifications, variations, combinations, or equivalents that cover the scope of this application.

Obviously, a person skilled in the art can make various modifications and variations to this application without departing from the scope of this application. In this way, this application is intended to cover these modifications and variations of embodiments of this application provided that they fall within the scope defined by the claims of this application and their equivalent technologies.

What is claimed is:

1. A display, comprising a self-luminous array, a pixel expansion apparatus, and a lens of an optical engine, wherein:

the self-luminous array comprises a plurality of self-luminous pixels, wherein a color of a light beam emitted by a first self-luminous pixel in the plurality of self-luminous pixels is different from a color of a light beam emitted by a second self-luminous pixel, and the first self-luminous pixel is adjacent to the second self-luminous pixel;

the pixel expansion apparatus comprises a driver and a transparent flat plate, wherein the driver is configured to drive rotation of the transparent flat plate;

a light beam emitted by the self-luminous array is imaged on an imaging plane of the lens of the optical engine through the transparent flat plate; and the transparent flat plate is configured to be driven by the driver to perform a rotation operation, wherein a first area on the imaging plane displays different colors in a time-division manner, the different colors being produced by imaging, in different time units, light beams emitted by different self-luminous pixels of the plurality of self-luminous pixels onto the same first area, and the first area is any unit imaging area in an imaging area of the imaging plane.

2. The display according to claim 1, wherein N self-luminous pixels in the self-luminous array form one pixel unit, the N self-luminous pixels comprise at least two self-luminous pixels that emit light beams of different colors, and N is a positive integer greater than 2;

wherein the driver is configured to control, in the time-division manner, rotation of the transparent flat plate in a rotation periodicity of the transparent flat plate, wherein the transparent flat plate switches between N1 states, wherein the first area on the imaging plane displays colors of N self-luminous pixels of a first pixel unit in the time-division manner, and wherein N1 is a positive integer less than or equal to N; and wherein the first pixel unit is one pixel unit comprised in the self-luminous array.

3. The display according to claim 2, wherein the rotation periodicity comprises a first time unit and a second time unit;

wherein in the first time unit, when the transparent flat plate is driven by the driver to rotate to be in a first state, the transparent flat plate outputs a first light beam;

wherein in the second time unit, when the transparent flat plate is driven by the driver to rotate to be in a second state, the transparent flat plate outputs a second light beam;

wherein the first state and the second state are two states in the N1 states, and the first time unit is adjacent to the second time unit; and wherein a spacing between the first light beam and the second light beam is a first spacing, and the first spacing is related to sizes of the N self-luminous pixels comprised in the first pixel unit.

4. The display according to claim 3, wherein a value of N1 is related to the sizes of the N self-luminous pixels comprised in the first pixel unit.

5. The display according to claim 4, wherein the sizes of the N self-luminous pixels comprised in the first pixel unit are the same, and N1 is equal to N.

6. The display according to claim 4, wherein the sizes of the N self-luminous pixels comprised in the first pixel unit are the same, and a spacing between any two adjacent self-luminous pixels in the N self-luminous pixels is a second spacing; and wherein the first spacing is the same as the second spacing.

7. The display according to claim 4, wherein the first pixel unit comprises the first self-luminous pixel and the second self-luminous pixel, and further comprises a third self-luminous pixel, wherein a size of the second self-luminous pixel is twice a total size of the first self-luminous pixel and the third self-luminous pixel, wherein N is 3, and wherein N1 is 2.

8. The display according to claim 7, wherein a spacing between a total area occupied by the first self-luminous pixel and the third self-luminous pixel and an area occupied by the second self-luminous pixel is a third spacing; and wherein the first spacing is the same as the third spacing.

9. The display according to claim 8, wherein the first self-luminous pixel and the second self-luminous pixel are sequentially set in a specified direction; and wherein a shift direction of the second light beam relative to the first light beam is the specified direction.

10. The display according to claim 9, wherein a rotation angle of the transparent flat plate in the second state relative to the transparent flat plate in the first state is a specified angle, and the specified angle and the first spacing meet the following condition:

$$\Delta y = d \sin\theta\left(1 - \sqrt{\frac{1-\sin^2\theta}{n^2-\sin^2\theta}}\right), \text{ wherein}$$

wherein $\Delta y$ represents the first spacing, $\theta$ represents the specified angle, d represents a thickness of the transparent flat plate, and n represents a refractive index of the transparent flat plate.

11. An imaging method, wherein the method is applied to a display, the display comprises a self-luminous array, a pixel expansion apparatus, and a lens of an optical engine, the self-luminous array comprises a plurality of self-luminous pixels, the pixel expansion apparatus comprises a driver and a transparent flat plate, and the method comprises:

separately emitting, by the plurality of self-luminous pixels of the self-luminous array, light beams, wherein the light beams are imaged on an imaging plane of the lens of the optical engine through the transparent flat plate, wherein a color of a light beam emitted by a first self-luminous pixel in the plurality of self-luminous pixels is different from a color of a light beam emitted by a second self-luminous pixel, and wherein the first self-luminous pixel is adjacent to the second self-luminous pixel; and wherein the transparent flat plate is driven by the driver to rotate in a time-division manner, wherein a first area on the imaging plane of the lens of the optical engine displays different colors in the time-division manner, the different colors being produced by imaging, in different time units, light beams emitted by different self-luminous pixels of the plurality of self-luminous pixels onto the same first area, and wherein the first area is any unit imaging area in an imaging area of the imaging plane.

12. The method according to claim 11, wherein N self-luminous pixels in the self-luminous array form one pixel unit, the N self-luminous pixels comprise at least two self-luminous pixels that emit light beams of different colors, and N is a positive integer greater than 2; and wherein the method further comprises:

controlling, by the driver in the time-division manner, rotation of the transparent flat plate in a rotation periodicity of the transparent flat plate, wherein the transparent flat plate switches between N1 states, wherein the first area on the imaging plane displays colors of N self-luminous pixels of a first pixel unit in the time-division manner, and wherein N1 is a positive integer less than or equal to N; and wherein the first pixel unit is one pixel unit comprised in the self-luminous array.

13. The method according to claim 12, wherein the rotation periodicity comprises a first time unit and a second time unit; and wherein the controlling, by the driver in the time-division manner, rotation of the transparent flat plate in a rotation periodicity of the transparent flat plate comprises:

in the first time unit, driving, by the driver, the transparent flat plate to rotate to be in a first state, wherein the transparent flat plate outputs a first light beam; and in the second time unit, driving, by the driver, the transparent flat plate to rotate to be in a second state, wherein the transparent flat plate outputs a second light beam, wherein the first state and the second state are two states in the N1 states, wherein the first time unit is adjacent to the second time unit, wherein a spacing between the first light beam and the second light beam is a first spacing, and wherein the first spacing is related to sizes of the N self-luminous pixels comprised in the first pixel unit.

14. The method according to claim 13, wherein a value of N1 is related to the sizes of the N self-luminous pixels comprised in the first pixel unit.

15. The method according to claim 14, wherein the sizes of the N self-luminous pixels comprised in the first pixel unit are the same, and a spacing between any two adjacent self-luminous pixels in the N self-luminous pixels is a second spacing; and wherein the first spacing is the same as the second spacing.

16. The method according to claim 14, wherein the first pixel unit comprises the first self-luminous pixel and the second self-luminous pixel, and further comprises a third self-luminous pixel, wherein a size of the second self-luminous pixel is twice a total size of the first self-luminous pixel and the third self-luminous pixel, wherein N is 3, and wherein N1 is 2.

17. The method according to claim 16, wherein a spacing between a total area occupied by the first self-luminous pixel and the third self-luminous pixel and an area occupied by the second self-luminous pixel is a third spacing; and wherein the first spacing is the same as the third spacing.

18. The method according to claim 17, wherein the first self-luminous pixel and the second self-luminous pixel are sequentially set in a specified direction; and wherein a shift direction of the second light beam relative to the first light beam is the specified direction.

19. The method according to claim 14, wherein a rotation angle of the transparent flat plate in the second state relative to the transparent flat plate in the first state is a specified angle, and the specified angle and the first spacing meet the following condition:

$$\Delta y = d\sin\theta\left(1 - \sqrt{\frac{1-\sin^2\theta}{n^2-\sin^2\theta}}\right), \text{ wherein}$$

wherein Δy represents the first spacing, θ represents the specified angle, d represents a thickness of the transparent flat plate, and n represents a refractive index of the transparent flat plate.

20. The method according to claim 14, wherein the sizes of the N self-luminous pixels comprised in the first pixel unit are the same, and N1 is equal to N.

* * * * *